(12) United States Patent
Allmen et al.

(10) Patent No.: US 12,386,100 B2
(45) Date of Patent: Aug. 12, 2025

(54) LIGHT GRID WITH DISTANCE MEASUREMENT

(71) Applicant: CEDES AG, Landquart (CH)

(72) Inventors: Andri von Allmen, Landquart (CH); Nannan Zhang, Changshu (CN)

(73) Assignee: CEDES AG, Landquart (CH)

( * ) Notice: Subject to any disclaimer, the term of this patent is extended or adjusted under 35 U.S.C. 154(b) by 0 days.

(21) Appl. No.: 18/992,690

(22) PCT Filed: Jul. 14, 2023

(86) PCT No.: PCT/EP2023/069697
§ 371 (c)(1),
(2) Date: Jan. 9, 2025

(87) PCT Pub. No.: WO2024/013387
PCT Pub. Date: Jan. 18, 2024

(65) Prior Publication Data
US 2025/0164663 A1    May 22, 2025

(30) Foreign Application Priority Data
Jul. 14, 2022   (EP) .................................... 22185045

(51) Int. Cl.
*G01V 8/20*       (2006.01)
*G01V 13/00*      (2006.01)

(52) U.S. Cl.
CPC ............... *G01V 8/20* (2013.01); *G01V 13/00* (2013.01)

(58) Field of Classification Search
CPC ............. G01V 8/10; G01V 8/20; G01V 13/00
See application file for complete search history.

(56) References Cited

U.S. PATENT DOCUMENTS 4,266,124 A * 5/1981 Weber .................... F16P 3/144
                                                       250/221
2005/0133702 A1   6/2005 Meyer
(Continued)

FOREIGN PATENT DOCUMENTS

CN        111273371 A      6/2020
DE     102012109985 A1     5/2014

OTHER PUBLICATIONS

International Search Report and Written Opinion for PCT Application No. PCT/EP2023/069697, Dated Oct. 10, 2023, 14 pages including English Translation.
(Continued)

*Primary Examiner* — Kevin K Pyo
(74) *Attorney, Agent, or Firm* — Christopher J. Volkmann; Kelly, Holt & Christenson P.L.L.C.

(57) ABSTRACT

A light grid for determining the distance between transmitter and receiver strips, includes a transmitter strip with one or more transmitter elements which emit radiation having a specific intensity, a receiver strip with one or more receiver elements which receive the radiation from an assigned transmitter element, and a control device for controlling the transmitter elements and/or the receiver elements and for evaluating the receiver elements. At least one of the transmitter elements and/or at least one of the receiver elements are configured as qualified transmitter and receiver elements. The control device is configured to control different combinations of intensities and amplification factors of the qualified transmitter and/or receiver elements and to ascertain a distance value as a function of the sum of the resulting intensity values of the controlled combinations.

10 Claims, 3 Drawing Sheets

(56) References Cited

U.S. PATENT DOCUMENTS

| | | |
|---|---|---|
| 2011/0204211 A1 | 8/2011 | Klingelhofer |
| 2011/0206366 A1* | 8/2011 | Klingelhofer ............ G01V 8/20 398/9 |
| 2016/0178794 A1 | 6/2016 | Rollins |

OTHER PUBLICATIONS

International Preliminary Report of Patentability for PCT Application No. PCT/EP2023/069697, Dated Sep. 30, 2024, 29 pages including English Translation,.

* cited by examiner

LIGHT GRID WITH DISTANCE MEASUREMENT

CROSS-REFERENCE TO RELATED APPLICATIONS

This Application is a Section 371 National Stage Application of International Application No. PCT/EP2023/069697, filed Jul. 14, 2023, and published as WO 2024/013387A1 on Jan. 18, 2024, and claims priority to European Application No. 22185045.6, filed Jul. 14, 2022; the contents of each application are hereby incorporated by reference in their entirety.

BRIEF DESCRIPTION OF THE DRAWINGS

FIG. 2b illustrates a half-open double sliding door as in FIG. 2a.

FIG. 2c illustrates a closed double sliding door as in FIG. 2a.

DETAILED DESCRIPTION

Figure 1:
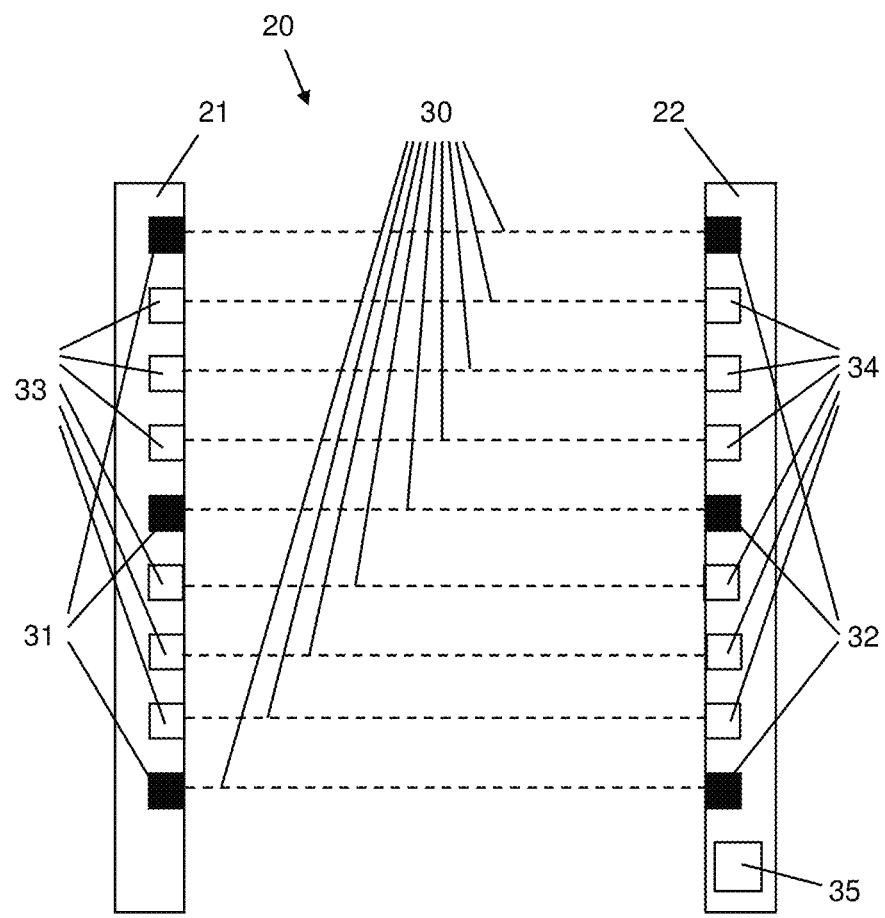
FIG. 1 illustrates a light grid, in one example.

The present disclosure relates to a light grid for object detection.

Light grids are known from the state of the art, which have a transmitter strip and a receiver strip and form a grid of light beams between them for object detection. In particular, one or both strips of the light grid can be attached to the sliding door or sliding doors of an elevator cabin to detect the passage of an object through the open door area.

A light curtain is known from CN 111 273 371 A, in which the transmitter and receiver can each be controlled by a control unit in such a way that the transmitters emit with different intensities and the receivers amplify differently. The number of time periods scanned during reception can also be set. This can improve the installation of the light curtain, especially at greater distances, to reduce or eliminate inaccuracies during installation and inaccuracies caused by ambient light.

An object of the present disclosure is to provide a light grid that enables more differentiated monitoring at low cost.

Based on a light grid of the type mentioned at the beginning, this object is achieved by a light grid according to claim 1. Advantageous embodiments are provided in the additional dependent claims.

The light grid according to one example is a light grid for determining the distance between transmitter and receiver strips with a transmitter strip with one or more transmitter elements which emit radiation with a specific intensity, with a receiver strip with one or more receiver elements which receive the radiation of an assigned transmitter element, and with a control device for activating the transmitter elements and/or the receiver elements and for evaluating the receiver elements, wherein in each case the transmitter element and the receiver element or in each case at least one of the transmitter elements and/or at least one of the receiver elements are designed as qualified transmitter and receiver elements, wherein the qualified transmitter element or the qualified transmitter elements are designed to emit different intensities and/or the qualified receiver element or the qualified receiver elements are designed to apply different amplifications and to output an intensity value for the received and amplified radiation, and the control device is designed to control different combinations of intensities and amplifications of the qualified transmitter and/or receiver elements and to determine a distance value as a function of the sum of the resulting intensity values of the controlled combinations.

This can have the advantage that the distance between the transmitter and receiver strips can be determined. At the same time, dynamic processes can also be tracked and analyzed very well. The grid, on the other hand, does not compromise any safety requirements.

Preferably, the light grid, in particular the transmitter and receiver strip, includes at least one or more additional transmitter and receiver elements, which are each designed as simple transmitter elements and simple receiver elements and which are each designed as light barriers and which preferably do not contribute to the combinations and/or from which the distance value is not determined, and/or which are used for object detection, and/or whose simple transmitter elements emit at least one intensity like the qualified transmitter elements and whose receiver elements have at least one amplification like the qualified receiver elements.

This offers the advantage of enabling the light grid to be used for object detection. This can have the advantage that not all transmitter and receiver elements need to be qualified, which reduces the complexity of the light grid and saves costs. However, such an embodiment also enables a compromise between precise object detection and a cost advantage, which is achieved by the fact that not all transmitter or receiver elements have to be equipped with the same functions, but individual elements can also be equipped with fewer functions at a lower cost.

According to one example, the control device is designed to control the combinations one after the other in a sequence and, in particular, to repeat the sequence periodically and, in particular, to determine the sum of the controlled combinations of a sequence and, in particular, to determine a distance value for each sequence. Preferably, the control device is designed to control all different combinations of intensities and amplifications of the qualified transmitter and/or receiver elements, in particular, however, without using the highest intensity of the qualified transmitter elements for the combinations, and/or to use those intensities and amplifications of the qualified transmitter and receiver elements for the object detection which correspond to the intensities and amplifications of simple (non-qualified) transmitter and/or receiver elements.

This can have the advantages that a time period is fixed after the distance value is available, that the distance value is determined quasi-continuously and repeatedly, and that the distance value is available dynamically in a time sequence. This can have the advantage that the distance value can be calculated quickly and easily. This can have the advantage of achieving maximum resolution or accuracy for the distance value. This can have the advantage that the number of transmitter and receiver elements required for object detection does not have to be increased by the qualified transmitter and receiver elements.

Preferably, the one or more qualified transmitter elements are designed to individually emit several different intensities, and/or to emit different intensities relative to one another, and/or to emit the same intensity, which is in particular the highest intensity and in particular corresponds to the intensity of the non-qualified transmitter elements.

This can have the advantage that optimized intensities are available for different distance ranges, that the resolution of the distance value is increased, that the resolution of the distance value is uniformly constant over the entire distance range. This can have the advantage that the qualified transmitter elements can also be used for object detection.

Preferably, the one or more qualified receiver elements are designed to each individually apply several different amplifications, and/or to apply the same different amplifications, and/or to each apply the same amplification, which is in particular the highest, and in particular corresponds to the amplification of the non-qualified, i.e. simple receiver elements.

This can have the advantage that optimized amplifications are available for different distance ranges, that the resolution of the distance value is increased, that the resolution of the distance value is uniformly constant over the entire distance range. This can have the advantage that the qualified receiver elements can also be used for object detection.

Preferably, the light grid includes three qualified transmitter and receiver elements in each case, as well as additional simple transmitter and receiver elements which do not contribute to the combinations and/or from which the distance value is not determined. Preferably, the one or more qualified transmitter elements are designed to emit three intensities each, wherein one intensity is equal to the intensity of the non-qualified, i.e. simple transmitter elements, which are provided for object detection, and wherein two intensities are lower than the one intensity and are each different from all other intensities. Preferably, the one or more qualified receiver elements are each designed to apply the same two different amplifications, with the higher amplification corresponding to the amplification of the non-qualified, i.e. simple receiver elements, which are provided for object detection. Preferably, the control device is designed to form twelve combinations of the three qualified transmitter and receiver elements, the two altogether different, lower intensities of the qualified transmitter elements and the two different, in each case equal amplifications of the receiver elements. Preferably, the control device is designed to use those intensities and amplifications of the qualified transmitter and receiver elements for object detection which correspond to the intensities and amplifications of non-qualified, i.e. simple transmitter and/or receiver elements.

This can have the advantage that a very fine resolution is available for the distance value.

Preferably, the light grid includes a transmission device designed to transmit the distance value remotely.

This can have the advantage that the behavior of the cabin door can be transmitted and evaluated without interfering with the elevator's control system and electronics.

Further features of the present disclosure are illustrated in the drawings.

The advantages mentioned in each case can also be realized for combinations of features in whose context they are not mentioned.

FIG. 1 shows a light grid 20 according to one example with the transmitter strip 21 and the receiver strip 22. The transmitter strip 21 includes three qualified transmitter elements 31 and additional non-qualified transmitter elements 33, which can emit IR radiation with a certain intensity. The receiver strip 22 includes three qualified receiver elements 32 and additional non-qualified receiver elements 34. The transmitter strip and receiver strip are arranged vertically, parallel to each other and opposite each other at the same height. A qualified receiver element 32 is assigned to each qualified transmitter element 31 at the same height and together they form a horizontal transmitter steel 30. The light grid 20 also includes a control device 35.

Figure 2A:
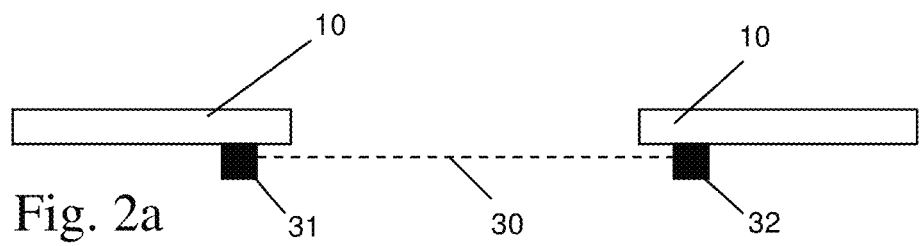
FIG. 2a illustrates an open double sliding door of an elevator cabin with light grid, in one example.
Figure 2B:
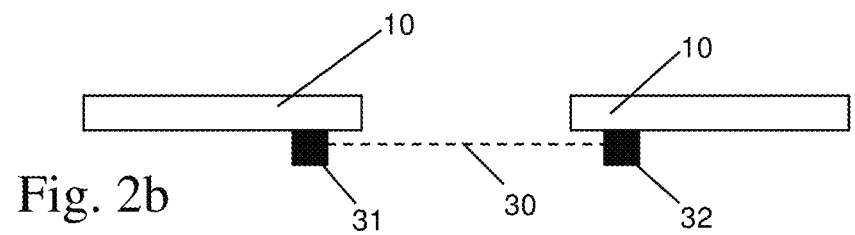
Figure 2C:
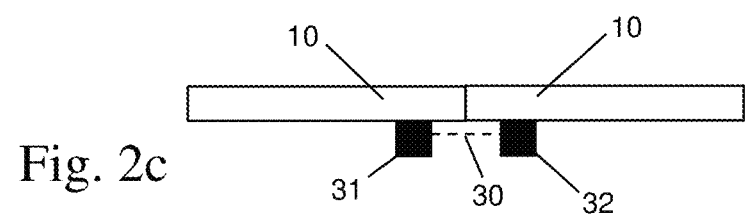

FIGS. 2a to 2c show the light grid 20 of FIG. 1 on a double sliding door 10 of an elevator cabin. The transmitter strip 31 is attached to one leaf of the double sliding door and the receiver strip 32 is attached to the opposite leaf of the double sliding door. The other arrangement is as in FIG. 1. Transmitter strip 31 and receiver strip move with the double sliding doors and remain parallel and at the same height to each other, so that the light beams remain horizontal and assigned to the corresponding qualified transmitter and receiver elements. They reduce their distance together with doors when the doors close, and they increase their distance together with the doors when the doors open. The distance between the transmitter and receiver strips corresponds to the distance between the two leaves of the double sliding door except for a constant factor. FIG. 2a shows the open door. FIG. 2b shows the half-closed door. FIG. 2c shows the closed door.

The non-qualified transmitter elements transmit with the intensity Tx:High and the non-qualified receiver elements include the two amplifications Rx:High and Rx:Low. Rx:Low is lower than Rx:High. The amplifications are applied simultaneously and evaluated separately.

The first qualified transmitter element T1 can transmit the intensity T1:Low1, T1:Mid1, or T1:High, the second qualified transmitter element T2 can transmit the intensity T2:Low2, T2:Mid2 or T3:High, and the third qualified transmitter element T3 can transmit the intensity T3:Low3, T3:Mid3 or T3:High. The intensities Tx:High, T1:High, T2:High and T3:Hight are the same. All other intensities are lower. The sequence of intensities is ascending: T1:Low1<T2:Low2<T3:Low3<Mid1<Mid2<Mid3<Tx: High. The three qualified receiver elements R1, R2, R3 can each apply the amplifications Rx:Low or Rx:High.

The control device controls the non-qualified transmitter and receiver elements in such a way that Rx:High is used for distances over 1 m and Rx:Low is used for distances under 1 m, the latter to avoid reflections.

The control device controls a sequence of combinations of different intensities and amplifications and evaluates these to obtain a distance value. The highest intensity Tx:High is not used for this purpose. The combinations are each controlled and evaluated separately. The combinations are:

T1:Low1+R1:Low, T1:Mid1+R1:Low, T1:Low1+R1:High, T1:Mid1+R1:High

T2:Low2+R2:Low, T2:Mid2+R2:Low, T2:Low2+R2:High, T2:Mid1+R2:High

T3:Low3+R3:Low, T3:Mid3+R3:Low, T3:Low3+R3:High, T3:Mid1+R2:High

These are 12 combinations.

Figure 3:
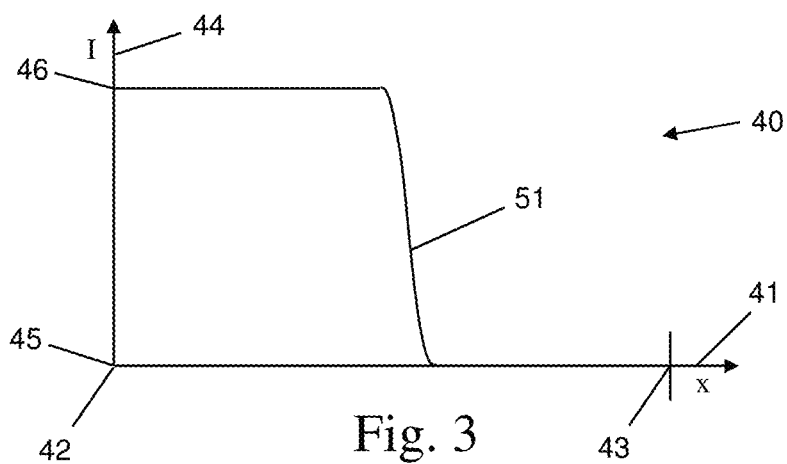
FIG. 3 illustrates a diagram of a measurement curve, in one example.

FIG. 3 is a diagram 40 for the intensity as a function of distance and shows the measurement curve of a combination. The X-axis 41 shows the distance from the transmitter strip to the receiver strip. Point 42 shows the minimum distance and point 43 shows the maximum evaluable distance. The Y-axis 44 shows the intensity value output by a qualified receiver element for a specific combination.

The measurement curve 51 shows an example of a combination with medium intensity of the qualifying transmitter element and medium amplification of the qualifying receiver element. The measurement curve 51 shows a very steep curve at medium distances and is in saturation at shorter distances and without a signal at further distances.

The measurement curve therefore only features a small distance range with good resolution.

Figure 4:
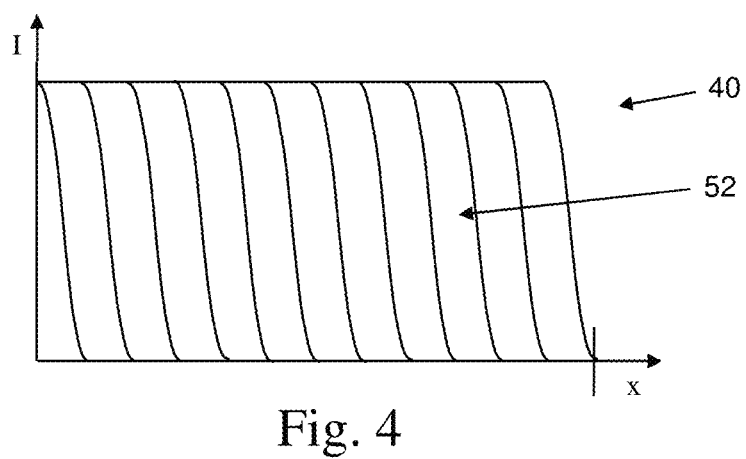
FIG. 4 illustrates a diagram with all measurement curves, in one example.

FIG. 4 is a diagram 40 according to FIG. 3 and shows an overlay of all twelve measurement curves 52 for the twelve combinations.

The different intensities and the amplification Rx:Low are selected in such a way that a largely uniform sequence of steep curves is achieved over the distance.

Figure 5:
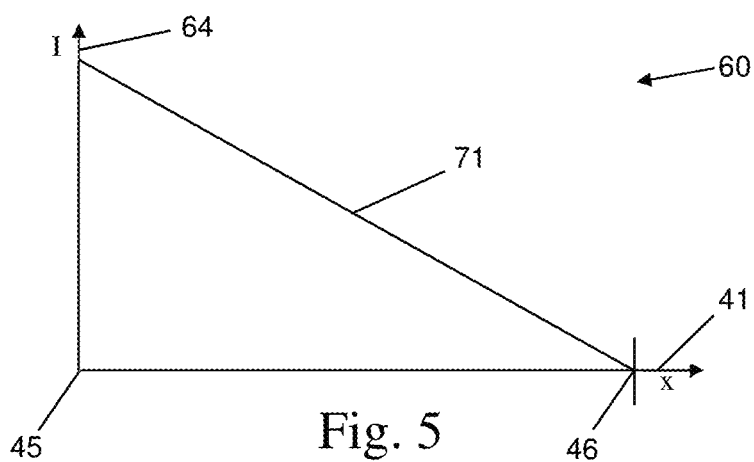
FIG. 5 illustrates a diagram of the distance value, in one example.

FIG. 5 shows a diagram for the sum of the intensity values of all twelve combinations. The X-axis is analogous to FIG. 3. The Y-axis shows the sum 71 of the intensity values of all twelve combinations from FIG. 4. The sum shows a largely linear progression across the entire distance.

The control device adds the measured and amplified intensity values of the twelve combinations of a sequence and outputs a distance value depending on the sum. The control device repeats the sequence periodically and outputs the distance value periodically.

The light grid according to one example can be used to measure the opening movement of the cabin door of an elevator. The distance from moving boundaries of a passage to be monitored by a light curtain can also be measured from the light curtain itself.

The light grid according to one example can have a transmitter device that transmits the distance value remotely, and in particular transmits it to a web cloud. This means that the data is also available for evaluations or is stored for longer periods of time to provide information about process sequences like a black box. In particular, this allows an elevator door to be monitored independently of the elevator control system.

Although the present invention has been described with reference to preferred embodiments, workers skilled in the art will recognize that changes may be made in form and detail without departing from the spirit and scope of the invention.

LIST OF REFERENCE SYMBOLS

10 Cabin door
20 Light grid
21 Transmitter strip
22 Receiver strip
30 Light beams
31 Qualified transmitter elements
32 Qualified receiver elements
33 Simple transmitter elements
34 Simple receiver elements
35 Control device
40 Diagram of intensity as a function of distance
41 X-axis: Distance between transmitter and receiver strip
42 Minimum distance
43 Maximum distance
44 Y-axis: Received and amplified intensity
45 No detection
46 Saturation
51 Measurement curve for one intensity and one amplification
52 12 measurement curves from 6 intensities and 2 amplifications
60 Diagram of the sum of the 12 measurement curves received
64 Y-axis: Sum of the amplified intensities
71 Sum of the 12 measurement curves of 6 intensities and 2 amplifications

The invention claimed is:

1. A light grid
to determine the distance between transmitter and receiver strips
with a transmitter strip with one or more transmitter elements,
which emit radiation with a certain intensity,
with a receiver strip with one or more receiver elements,
which receive the radiation of an assigned transmitter element, and
with a control device
for controlling the transmitter elements and/or the receiver elements and
for evaluating the receiver elements,
wherein
in each case the transmitter element and the receiver element or in each case at least one of the transmitter elements and/or at least one of the receiver elements are designed as qualified transmitter and receiver elements, wherein
the qualified transmitter element or the qualified transmitter elements are designed to emit different intensities, and/or
the qualified receiver element or the qualified receiver elements are designed to apply different amplifications and to output an intensity value for the received and amplified radiation, wherein
the control device is designed
to control different combinations of intensities and amplifications of the qualified transmitter and/or receiver elements
and determine a distance value depending on the sum of the resulting intensity values of the controlled combinations,
wherein the light grid
includes at least one additional transmitter and receiver element,
which are each designed as simple transmitter elements and simple receiver elements
and which are each designed as light barriers,
wherein the control device is designed
to control the combinations one after the other in a sequence
and to repeat the sequence periodically
and to determine the sum of the controlled combinations of a sequence
and to determine a distance value for each sequence.

2. The light grid according to claim 1, wherein
at least one additional transmitter and receiver elements,
which are each designed as simple transmitter elements and simple receiver elements
and which are each designed as light barriers
preferably do not contribute to the combinations and/or from which the distance value is not determined from these,
and/or in that these are used for object detection,
and/or in that their simple transmitter elements emit at least one intensity like the qualified transmitter elements and their receiver elements have at least one amplification like the qualified receiver elements.

3. The light grid according to claim 1, wherein
the control device is designed
to control all different combinations of intensities and amplifications of the qualified transmitter and/or receiver elements.

4. The light grid according to claim 3, wherein the control device is designed
- to control all different combinations of intensities and amplifications of the qualified transmitter and/or receiver elements, but without using the highest intensity of the qualified transmitter elements for the combinations,
- or to use those intensities and amplifications of the qualified transmitter and receiver elements for object detection which correspond to the intensities and amplifications of simple transmitter and/or receiver elements.

5. The light grid according to claim 1, wherein the one or more qualified transmitter elements are designed to individually emit a plurality of different intensities, or to emit different intensities relative to one another, or to emit the same intensity in each case.

6. The light grid according to claim 5, wherein the one or more qualified transmitter elements are designed to emit an intensity which is the highest intensity and corresponds to the intensity of the simple transmitter elements.

7. The light grid according to claim 1, wherein the one or more qualified receiver elements are designed to each individually apply several different amplifications, or to apply the same different amplifications, or to apply the same amplification in each case.

8. The light grid according to claim 7, wherein the one or more qualified receiver elements are adapted to apply an amplification which is the highest and corresponds to the amplification of the simple receiver elements.

9. The light grid according to claim 1, wherein the light grid includes in each case three qualified transmitter and receiver elements and also includes additional simple transmitter and receiver elements which do not contribute to the combinations and/or from which the distance value is not determined, the one or more qualified transmitter elements are designed to emit in each case three intensities, wherein one intensity is equal to the intensity of the simple transmitter elements which are provided for object detection, and wherein two intensities are lower than the same one and are each different from all other intensities, and the one or more qualified receiver elements are adapted to apply the same two different amplifications, respectively, wherein the higher amplification corresponds to the amplification of the simple receiver elements which are provided for object detection, and the control device is designed to form twelve combinations of the three qualified transmitter and receiver elements, the two overall different, lower intensities of the qualified transmitter elements and the two different, respectively equal amplifications of the receiver elements and to use those intensities and amplifications of the qualified transmitter and receiver elements for object detections which correspond to the intensities and amplifications of simple transmitter and/or receiver elements.

10. The light grid according to claim 1, wherein the light grid includes a transmission device which is designed to transmit the distance value remotely.

* * * * *